May 1, 1928.

V. SOLLA 1,668,028

DIRECTION INDICATOR FOR VEHICLES

Filed Sept. 22, 1927   3 Sheets-Sheet 1

Vicente Solla  INVENTOR

BY *Victor J. Evans*

ATTORNEY

WITNESSES

May 1, 1928.  1,668,028
V. SOLLA
DIRECTION INDICATOR FOR VEHICLES
Filed Sept. 22, 1927   3 Sheets-Sheet 2
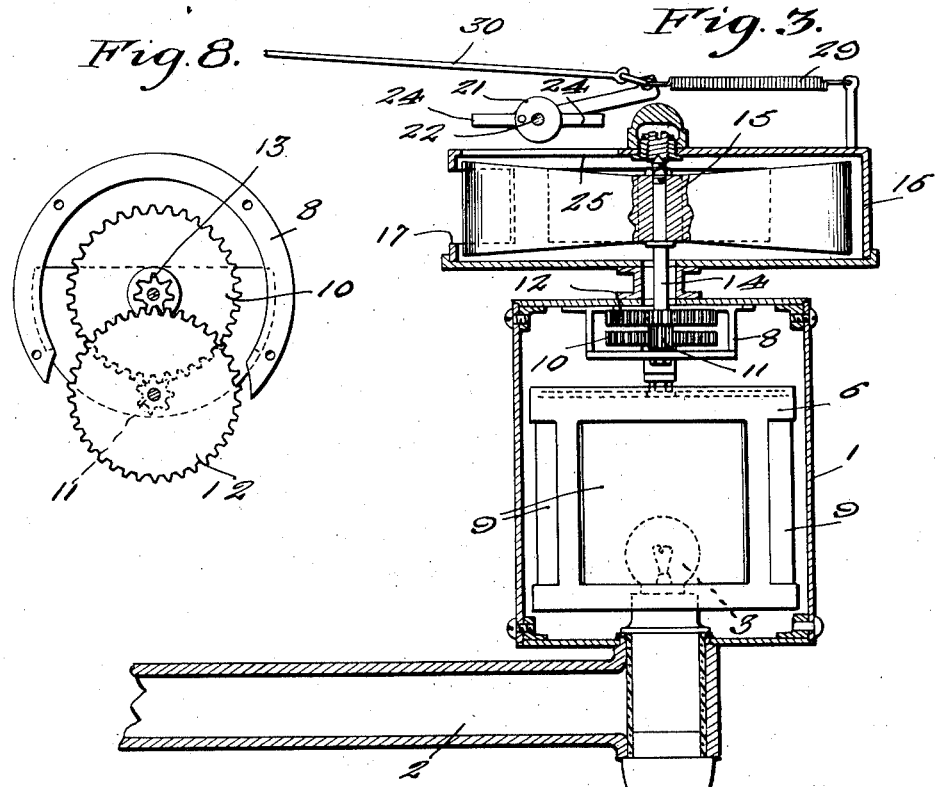
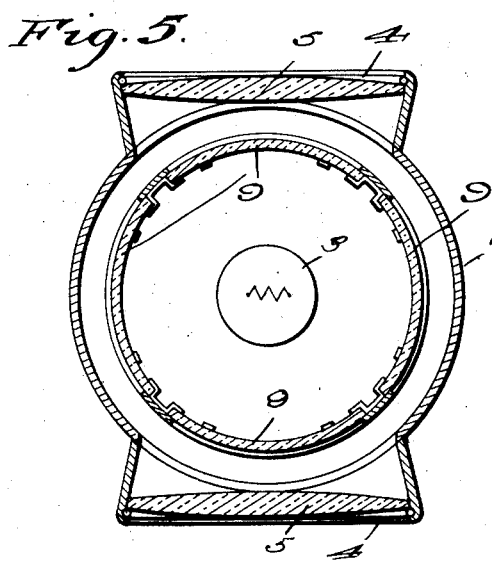
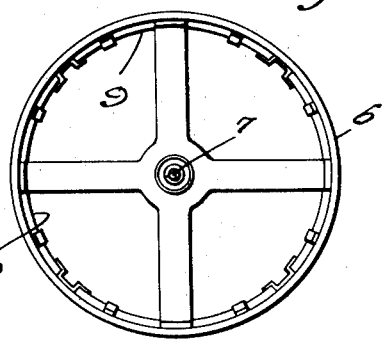
Vicente Solla INVENTOR
BY Victor J. Evans ATTORNEY
WITNESSES

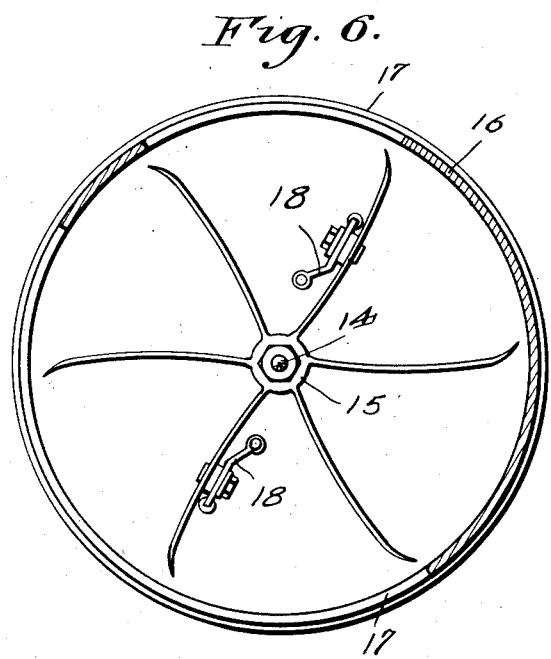
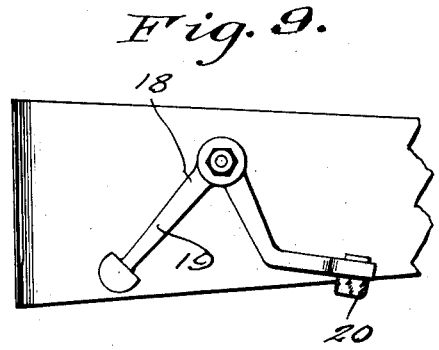
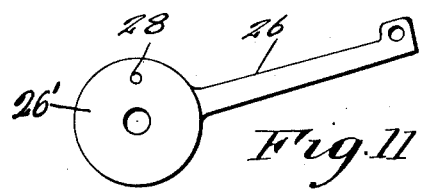
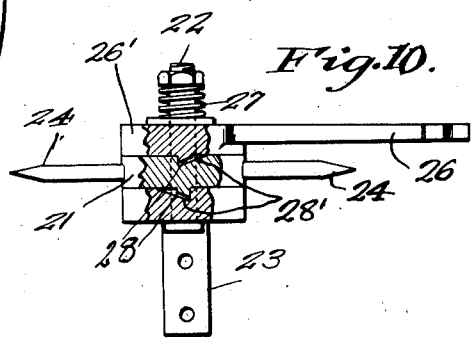
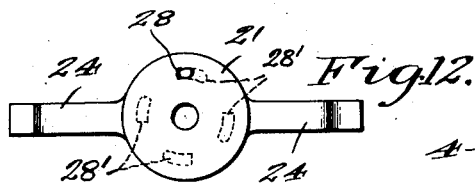
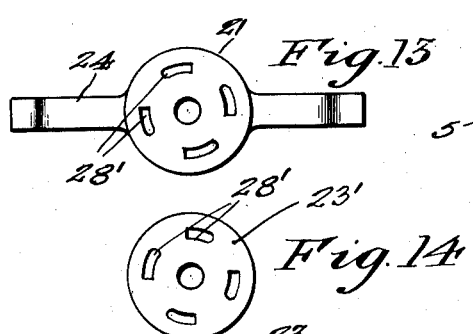
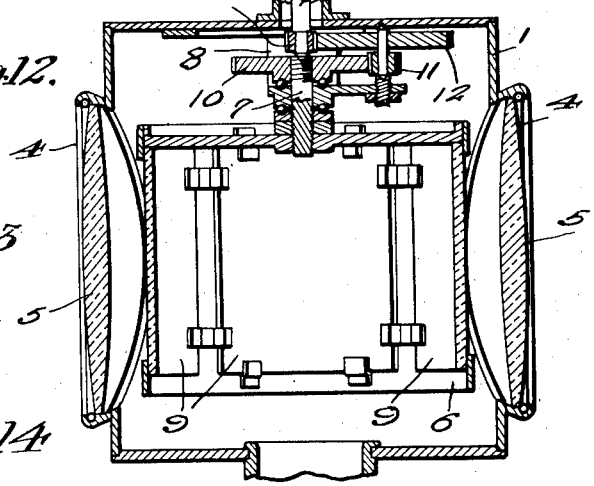

Patented May 1, 1928.

1,668,028

UNITED STATES PATENT OFFICE.

VICENTE SOLLA, OF CATANO, PORTO RICO.

DIRECTION INDICATOR FOR VEHICLES.

Substitution for application Serial No. 538,266, filed February 21, 1922. This application filed September 22, 1927. Serial No. 221,407.

This invention relates to indicators adapted to be applied to a vehicle and one object of the invention is to provide a device for indicating when an automobile or other vehicle is to stop or continue its movement so that the drivers of other vehicles and pedestrians can act accordingly.

The present application is a substitution for my former application Serial No. 538,266 filed February 21, 1922, and allowed February 7, 1924.

The invention includes a rotary device for flashing light signals of different colors and operating means for the rotary member including a wind motor caused to actuate by an air current created by movement of the vehicle.

The invention also consists in certain other features of construction and in the combination and arrangement of the several parts to be hereinafter fully described, illustrated in the accompanying drawings and specifically pointed out in the appended claims.

In describing my invention in detail, reference will be had to the accompanying drawings wherein like characters denote like or corresponding parts throughout the several views, in which—

Fig. 3 is an enlarged sectional view thereof;

Fig. 4 is an enlarged sectional view through the casing and the parts associated therewith;

Fig. 5 is a transverse sectional view through the casing;

Fig. 6 is a transverse sectional view through the fan;

Fig. 7 is a plan view of the frame;

Fig. 8 is a plan view of the gearing;

Fig. 9 is an enlarged view of the governor;

Fig. 10 is a sectional detail view of the stopping mechanism;

Fig. 11 is a detail view of a lever forming part of the stopping mechanism;

Fig. 12 is a view looking at one side of a disk forming part of the stopping mechanism;

Fig. 13 is a view looking at the other side of the disk shown in Fig. 12, and

Fig. 14 is a detail view of a bracket forming part of the stopping mechanism.

Figure 1:
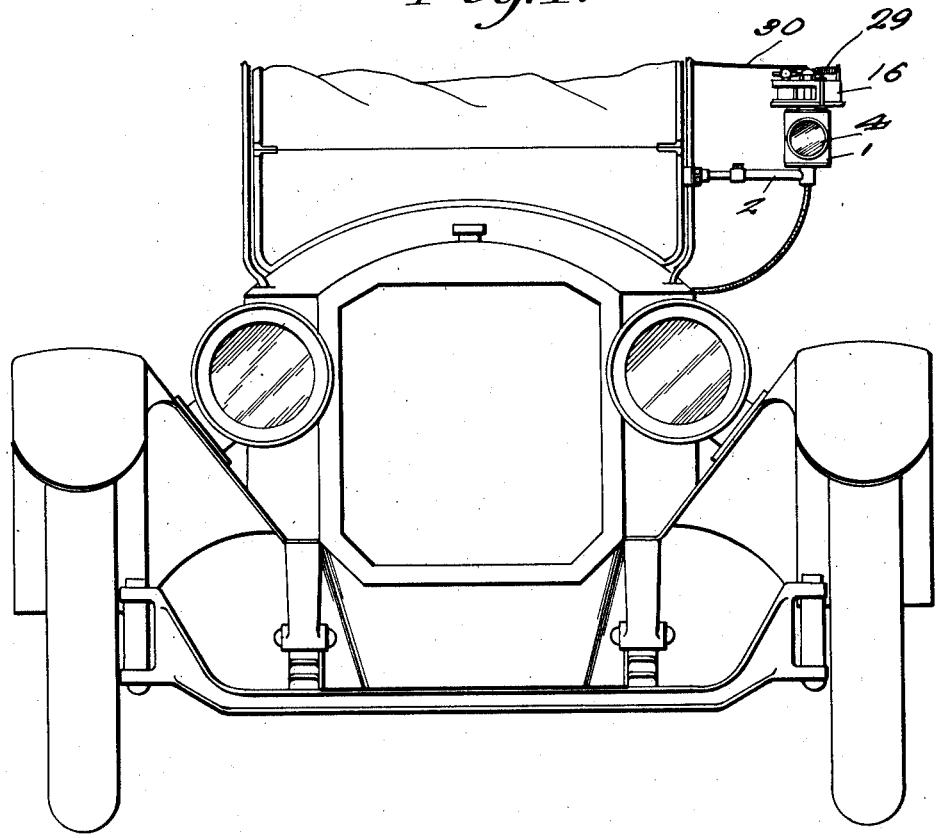
Figure 1 is a view showing the invention attached to a windshield frame of a motor vehicle.
Figure 2:
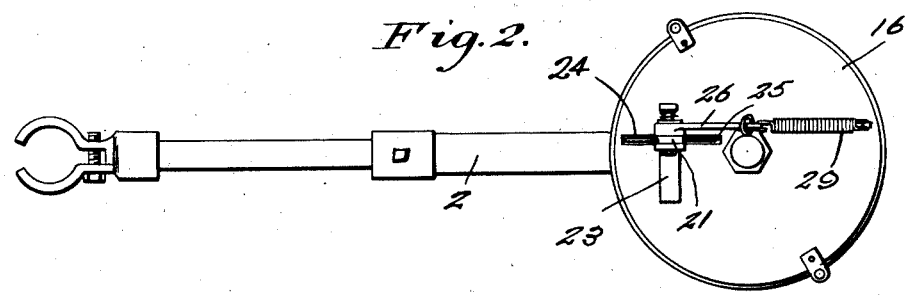
Fig. 2 is a plan view of the device.

As shown in these views, a casing 1 is supported in upright position upon an adjustable arm 2 which is adapted to be clamped to the windshield frame or any other suitable part of the vehicle so that it can be seen by pedestrians and drivers of other vehicles. An electric lamp 3 is suitably supported in the bottom of the casing and this lamp is adapted to be connected with the source of electrical supply. The casing is provided with a pair of oppositely arranged windows 4 each of which is closed by a lens 5. A hood for the lamp is disposed in the casing and consists of a frame 6 which is rotatably mounted in the casing by a shaft 7 journaled in a support 8 secured to the top of the casing. The bottom of the frame is open to receive the lamp and the sides of the frame are formed with opposed openings closed by transparent plates 9, a pair of opposed plates being preferably colored red and the other pair green. The parts are so arranged that rays of light from the lamp 3 pass through the transparent plates. Therefore, as the frame is rotated the plates will be successively brought in front of the lenses and red and green signals will alternately appear through each window of the casing. A large gear 10 is carried by the shaft 7 and this gear meshes with a small gear 11 fast upon a shaft carrying a large gear 12 which meshes with a small gear or pinion 13 carried by the shaft 14 of a fan 15. This fan is arranged in a casing 16 which is supported on the top of the casing 1 in such a manner that the fan shaft projects through a hole in the top of said casing 1 with its lower end resting upon the upper end of the shaft 7 and its pinion 13 meshing with the gear 12. The casing 16 is provided with openings 17 so that currents of air caused by movement of the vehicle along a road can enter the casing and cause the fan to rotate. The movement of this fan will rotate the frame 6 through the train of gears shown.

In order to prevent the fan from rotating too fast, I have provided governors 18 which consist of weighted levers 19 pivotally connected with certain of the blades of the fan and carrying pads 20 for frictionally engaging a part of the casing 16. These governors are so arranged that when the fan exceeds a certain speed the levers will swing outwardly upon the pivots by centrifugal force and press the pads against the bottom of the casing and thus check the movement of the fan.

I also provide means for stopping the parts with either the red or green plates opposite the windows. Such means comprises a disk 21 rotatably mounted on a small shaft 22 which is supported by a bracket 23 arranged on the top of the casing 16. This disk carries a pair of arms 24 which are adapted to enter a slot 25 in the top of the casing 16 to engage one of the fan blades and thus stop the movement of the fan. A lever 26 has an enlarged part or head 26' loosely fitted upon the shaft and pressed against the disk by the spring 27, and this enlarged part, the disk 21 and the head 23' of the bracket 23 are provided with clutch pins 28 and companion grooves 28' so that the upward movement of the lever 26 will cause the disk to turn while return movement of the lever will not effect the disk. A spring 29 normally holds the lever in inoperative position and a flexible connection 30 has one end connected with the lever and its other end arranged at a point where it can be manipulated by the driver. Thus by drawing upon the cable the disk can be given a step by step movement to successively place its arms in engagement with the fan blades and to remove them from such engagement. Therefore, the fan can be stopped with either the green plate or the red plate opposite a window.

From the above it will be seen that alternate flashes of green and red will appear at the windows as the vehicle is traveling along due to the action of the air currents upon the fan. As soon as the vehicle stops the fan will cease to move and a constant red light or green light will show through the window to indicate that the vehicle is not moving. If the wind should be blowing with sufficient force to move the fan while the vehicle is stationary, the driver can operate the lever to move the arms of the disk to a position where they will stop the fan. Of course, this lever can be actuated while the vehicle is in motion to give a constant red light or a constant green light as desired.

From the foregoing description the advantages and novel features of my invention will be readily apparent.

I desire it to be understood that I may make changes in the construction and in the combination and arrangement of the several parts, provided that such changes fall within the scope of the appended claims.

Having thus described the invention, I claim:

1. A device of the class described comprising a casing having a window therein, a rotatable frame in the casing having its walls composed in part of transparent plates of different colors, a lamp in the casing and enclosed by the walls of the frame, a fan casing supported by the first casing, a fan in said fan casing acting as a motor, means for transmitting motion from said fan to said frame, and means whereby the fan will be moved by air currents produced by the movement of the vehicle.

2. A device of the class described comprising a casing having a window, a lamp in said casing, a hood for said lamp disposed in said casing and having transparent colored side portions, a shaft for said hood journaled in the casing to rotatably mount the hood, a rotatably mounted wind motor having a shaft extending into said casing, and means to transmit rotary motion from the shaft of said motor to the shaft of said hood.

3. A device of the class described comprising a casing having a window, a lamp in said casing, a hood for said lamp disposed in said casing and having transparent colored side portions, a bearing in said casing, a shaft extending from one end of said hood axially thereof and journaled in said bearing, a rotatably mounted wind motor having a shaft extending into said casing, and intermeshing gears for transmitting rotary motion from the shaft of said motor to the shaft of said hood.

4. A device of the class described comprising a casing having a window, a lamp in said casing, a hood for said lamp disposed in said casing and having transparent colored side portions, a bearing in said casing above the hood, a shaft extending axially from said hood and journaled in said bearing, a motor housing upon said casing, a wind motor rotatably mounted in said motor housing and having a shaft extending into said casing, a countershaft rotatably supported by said bearing, and intermeshing gears carried by said countershaft and the shafts of said hood and motor whereby rotary motion may be transmitted from the motor to the hood.

5. A device of the character described comprising a casing having a window, a lamp in said casing, a rotatably mounted member having a portion to act upon light passing from said lamp through said window, a wind actuated motor for said member having radiating blades, and a governor for said motor comprising a lever pivoted to one of said blades and having diverging arms, one arm having a cushion adjacent its free end and the other arm having its free end weighted to cause the lever to be moved by centrifugal force and swung to bring the cushion into functional engagement with a stationary member when the motor is rotating at a determined speed.

6. A device of the character described comprising a casing having a window, a lamp in said casing, a rotatably mounted member having a portion to act upon light passing from said lamp through said window, a wind actuated motor for said member having radiating blades, and governors carried by opposed blades and actuated by centrifugal force to frictionally engage a stationary member when the motor is rotating at a determined speed.

7. A device of the class described comprising a casing having a window, a lamp in said casing, a rotatably mounted member having a portion to act upon light passing from said lamp through said window, a wind actuated motor for rotating said member including a housing carried by said casing and a rotor in said housing having radiating blades, and manually operated means carried by said housing and movable into and out of position to engage said blades and prevent rotation of the rotor.

8. A device of the class described comprising a casing having a window, a lamp in said casing, a rotatably mounted member having a portion to act upon light passing from said lamp through said window, a wind actuated motor for rotating said member including a housing carried by said casing and a rotor in said housing having radiating blades, manually operated control means for said motor consisting of a mounting, a shaft extending therefrom, a disk loose upon said shaft and having arms extending therefrom, means to prevent rotation of the disk in one direction upon the shaft, a lever loose upon said shaft, means to cause rotation of the disk with the lever when the lever is swung in one direction, means yieldably holding said lever in engagement with said disk, and means whereby an operator may manually impart movement to the lever in an operative direction to rotate the disk and successively move its arms into and out of position to engage the blades of said rotor and prevent rotation thereof.

9. A device of the class described comprising a casing having a window, a lamp in said casing, a rotatably mounted member having a portion to act upon light passing from said lamp through said window, a wind actuated motor for rotating said member including a housing carried by said casing and a rotor in said housing having radiating blades, manually operated control means for said motor consisting of a mounting, a shaft extending therefrom, a disk loose upon said shaft and having arms extending therefrom, means to prevent rotation of the disk in one direction upon the shaft, and means whereby an operator may impart rotation to the disk in a step by step movement and successively move its arms into and out of position to engage the blades of said rotor and prevent operation of the motor.

In testimony whereof I affix my signature.

VICENTE SOLLA.